June 23, 1936.    H. C. SHAGALOFF    2,045,204
REFRIGERATING SYSTEM
Filed July 8, 1932
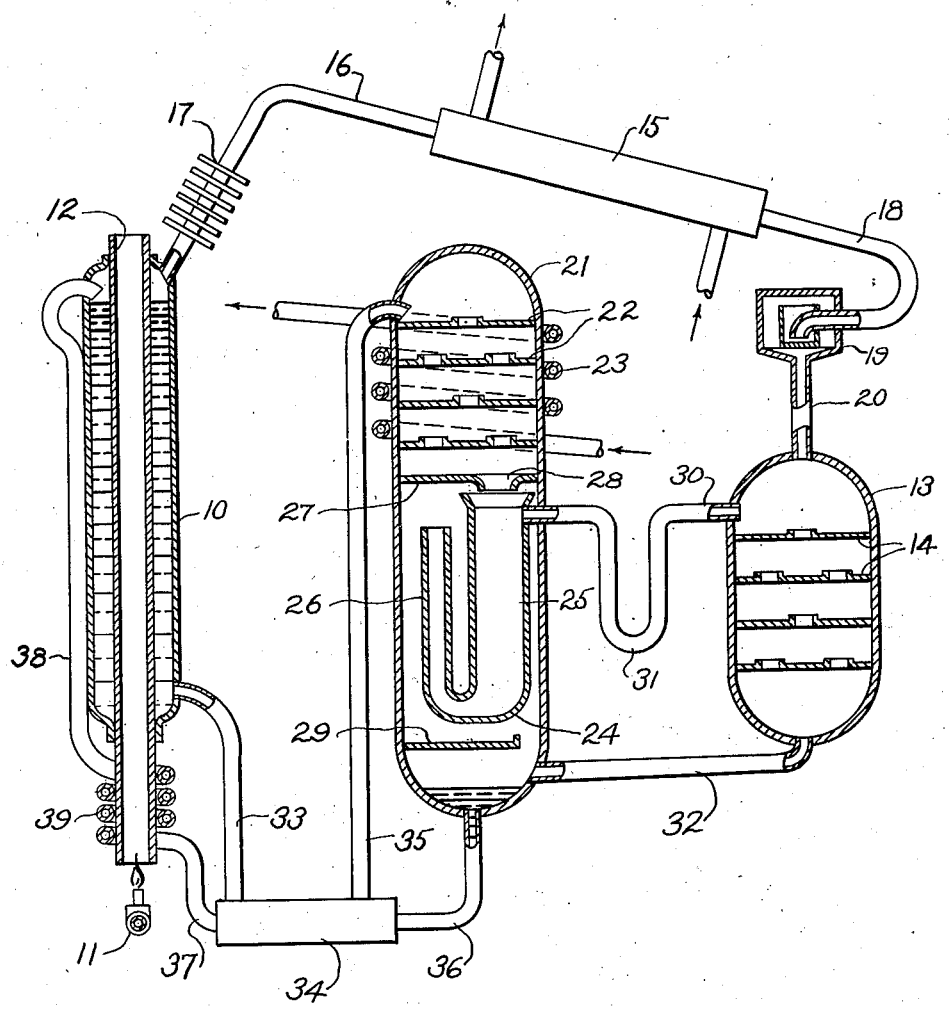
INVENTOR.
Harry C. Shagaloff
BY
ATTORNEY.

Patented June 23, 1936

2,045,204

UNITED STATES PATENT OFFICE 2,045,204

REFRIGERATING SYSTEM

Harry C. Shagaloff, Evansville, Ind., assignor, by mesne assignments, to Servel, Inc., Dover, Del., a corporation of Delaware Application July 8, 1932, Serial No. 621,326

28 Claims. (Cl. 62—119.5)

This invention relates to refrigeration and more particularly to refrigerating systems of the absorption type in which a plurality of cooling fluids are evaporated to produce refrigeration.

In systems of this type heretofore proposed, a plurality of cooling fluids are evaporated in an evaporator to produce a refrigerating effect and the resulting vapors conducted to an absorber in which one of the vaporous cooling fluids is dissolved into an absorption liquid. From the absorber, another of the vaporous cooling fluids is conducted to a condenser in which it is liquefied and delivered back to the evaporator. The first cooling fluid is expelled from solution by heating the absorption liquid in a generator and the expelled vapor is condensed to liquid and also returned to the evaporator.

In such systems, it is of course necessary that the absorber be operated at a temperature above the condensing temperature of the second cooling fluid at its absorber pressure so that condensation will occur in the second condenser rather than in the absorber. In this connection, it has been proposed to additionally heat the upper part of the absorber to insure the second cooling fluid remaining in vapor phase.

In accordance with this invention, the second cooling fluid is condensed to liquid in the absorber, that is, the absorber is operated at a temperature at which condensation of the second cooling fluid will occur for the pressure of this fluid in the absorber. The liquid cooling fluid is then separated from the enriched absorption liquid by stratification or flotation and returned, preferably directly, to the evaporator.

This invention eliminates a separate condenser for the inert cooling fluid thereby greatly simplifying this type of refrigerating system. Also, there is provided a new and novel absorber whereby a plurality of fluids, immiscible in liquid phase, are separately removed from a mixture thereof.

Other objects and advantages will be apparent from the following description taken in connection with the accompanying drawing in which the figure shows schematically, with parts in vertical section, a refrigerating system contemplated by this invention.

Referring to the drawing, a generator 10 adapted to contain a solution of refrigerant in an absorption liquid is heated by a burner 11 in a flue 12 which extends upwardly through the generator. The vapor space of the generator 10 is connected through rectifier 17 and conduit 16 to a condenser 15 which is connected through conduit 18 to a vessel 19 above the evaporator 13, the latter being provided with baffles 14 as well known in the art. The vessel 19 is connected to drain into the upper part of the evaporator through conduit 20.

The upper part of the absorber or separating vessel 21 is provided with baffle plates 22 and cooling means such as a water circulating coil 23, as well known in the art. In the lower part of the absorber is located a U-shaped vessel or liquid trap 24 having one leg 25 somewhat longer than the other leg 26. Above the liquid trap and below the baffles 22 is a partition 27 provided with an aperture 28 directly above the open end of leg 25 of the trap whereby all liquid descending from the portion of the absorber above the partition is directed into the longer leg 25 of the trap. Other baffles as represented by plate 29 may be provided to receive absorption liquid overflowing from the open end of the short leg 26, as hereinafter described.

The upper end of leg 25 of the trap 24 is connected from a level above the upper end of leg 26 through an overflow conduit 30 provided with a liquid trap 31, to the upper part of the evaporator 13. The lower part of the evaporator is connected through conduit 32 to the lower part of the absorber 21. A system well known in the art for circulating absorption liquid from the generator through the absorber is provided comprising a weak liquid path including conduit 33, liquid heat exchanger 34 and conduit 35, and a strong liquor path including conduit 36, liquid heat exchanger 34, conduit 37, and thermosyphon conduit 38, the lower part 39 of which is coiled about the lower end of the generator flue 12 thereby receiving heat from the burner 11.

As well known in this type of system, there may be employed two cooling fluids chemically inert with respect to each other and an absorption liquid in which only one of the cooling fluids is soluble. For the purpose of description, ammonia and propane are used as the cooling fluids and water as the absorption liquid for the ammonia. In the generator 10, ammonia vapor is expelled from solution by heating and the expelled vapor passes through the rectifier 17 and conduit 16 to the condenser 15 where the vapor is condensed to liquid. From the condenser, liquid ammonia flows through conduit 18 into the vessel 19 from which it flows through conduit 20 into the upper part of the evaporator 13. As more fully described below, liquid propane also enters the upper part of the evaporator 13 from conduit 30. Both the liquid ammonia and liquid propane flow downwardly over the baffle plates 14, evaporating by interdiffusion to produce a refrigerating effect. The resulting gas mixture of ammonia and propane flows from the lower part of the evaporator through conduit 32 into the absorber 21.

Weak absorption liquid from the generator 10 flows through conduit 33, liquid heat exchanger 34, and conduit 35 into the upper part of the absorber 21 where it flows downwardly over baffle plates 22 absorbing ammonia out of the gas mixture of ammonia and propane. As ammonia is absorbed out of the mixture, the pressure of the propane approaches the total pressure in the system and by means of the cooling coil 23 the upper part of the absorber is maintained at such a temperature that propane at this increased pressure condenses to liquid.

Both enriched absorption liquid and liquid propane flow through aperture 28 in the partition 27 into the upper end of leg 25 of the U-tube trap or separator 24. Since the immiscible propane is lighter than the absorption liquid, it stratifies and floats on the surface thereof in the leg 25 of the separator. The upper level of liquid propane in leg 25 of the separator will be above the level of enriched absorption liquid in the leg 26 due to difference in density of the liquid in the two columns. The separator is designed such that when it is filled with liquid to the level determined by overflow from the short leg 26, liquid propane will overflow, that is, be decanted through conduit 30 into the upper part of the evaporator 13. Absorption liquid which overflows from the short leg 26 of the separator passes downwardly over baffle plates represented in the schematic drawing by plate 29, further absorbing ammonia vapor, and accumulates in the lower part of the absorber from where it flows through conduit 36, liquid heat exchanger 34, and conduit 37 to the heated portion 39 of the thermosyphon 38 through which it is raised in a manner well known in the art back to the generator.

It will be obvious to those skilled in the art that various changes may be made in the construction and arrangement without departing from the spirit of the invention and therefore the invention is not limited to what is shown in the drawing and described in the specification but only as indicated in the following claims.

I claim:

1. The method of refrigerating which comprises supplying liquid ammonia and propane into an evaporator, conducting the gas mixture from said evaporator into an absorber, supplying water to said absorber to absorb ammonia out of the gas mixture, cooling said absorber to remove the heat of absorption and condense the propane to liquid, separating the propane in liquid phase from the water solution of ammonia intermediately in the path of flow of the water in contact with the gas mixture, conducting in liquid phase the separated propane to said evaporator, conducting the water solution of ammonia from said absorber to a generator, and distilling liquid ammonia from said generator into said evaporator.

2. In the method of refrigerating with an absorption system including a generator, condenser, evaporator, and absorber, and containing two cooling fluids adapted to be evaporated in the presence of each other in said evaporator, conducting the mixture of gaseous cooling fluids from said evaporator to said absorber, flowing absorption liquid from said generator through said absorber to remove one of said cooling fluids from the gas mixture, cooling the absorber to condense the other cooling fluid, withdrawing this condensed cooling fluid in liquid phase from the absorption liquid intermediately in the path of flow of the latter in contact with the gas mixture, and conducting in liquid phase the withdrawn fluid to said evaporator.

3. The method of refrigerating which includes supplying a plurality of liquid cooling fluids into an evaporator, conducting vapors from said evaporator to a separating vessel, changing the cooling fluid vapors to liquid in said vessel by absorption of one into an absorption liquid and condensation of the other, and conducting in liquid phase the condensed cooling fluid from said vessel to said evaporator.

4. The method of refrigerating which includes supplying a plurality of liquid cooling fluids into an evaporator, conducting vapors from said evaporator to a separating vessel, changing the cooling fluid vapors to liquid in said vessel by absorption of one into an absorption liquid and condensation of the other, removing the condensed cooling fluid in liquid phase from said vessel, and conducting the removed liquid by gravity to the evaporator.

5. The method of refrigerating which includes supplying liquid ammonia and propane into an evaporator, conducting ammonia and propane vapors from said evaporator to a separating vessel, absorbing the ammonia vapor into water and condensing propane vapor in said vessel, separating the liquid propane and water solution of ammonia by gravity, removing the propane in liquid phase, and conducting the removed propane by gravity to said evaporator.

6. In a refrigerating system comprising a generator, condenser, evaporator, and absorber connected for the circulation of a first cooling fluid, means for separating in liquid phase a second cooling fluid from other fluid in said absorber and conducting in liquid phase the separated fluid to said evaporator.

7. A refrigerating system comprising a generator and an absorber interconnected for the circulation of an absorption liquid therebetween, an evaporator, a condenser connected to receive vapor of a first cooling fluid from said generator and deliver liquid cooling fluid to said evaporator, a conduit for gas from said evaporator to said absorber arranged for drainage of unevaporated liquid to the latter, means spaced above the surface level of liquid in the absorber for separating a second cooling fluid in liquid phase from other fluid in said absorber, and means for conducting in liquid phase the separated cooling fluid to said evaporator.

8. In a refrigerating system comprising a generator, condenser, evaporator, and absorber connected for the circulation of a first cooling fluid and containing a second cooling fluid for circulation through said evaporator and absorber, a substantially U-shaped container having legs of unequal length open at their upper ends and positioned to receive in the longer leg both enriched absorption liquid and condensate of said second cooling fluid formed in said absorber, and a conduit having a liquid seal from the upper end of the longest leg of said vessel to said evaporator.

9. In a refrigerating system comprising a generator, condenser, evaporator, and absorber connected for the circulation of a first cooling fluid and containing a second cooling fluid for circulation between said evaporator and absorber, a vessel arranged to receive enriched absorption liquid and condensate of said second cooling fluid from said absorber, and means for separately withdrawing the enriched absorption liquid and condensed cooling fluid from their respective strata in said vessel.

10. A refrigerating system including an evaporator, means for supplying two liquid cooling fluids into said evaporator, an absorber connected to receive vapors from said evaporator, means for supplying said absorber with absorption liquid for dissolving the vapor of one of said cooling fluids, means for cooling said absorber to condense another of said cooling fluids to liquid, and means for removing in liquid phase the condensed cooling fluid by overflow from said absorber into said evaporator.

11. The method of refrigeration which comprises distilling liquid ammonia from a water solution thereof, evaporating the distilled ammonia and liquid propane in the presence of each other, conducting the resulting vapors first in counterflow to and contact with solution from which ammonia was previously distilled, to cause absorption of ammonia vapor in a zone above the condensing temperature of the propane, then conducting the vapors in similar relation to the solution in a zone below the condensing temperature of the propane to cause both further absorption of ammonia and condensation of propane to liquid phase, and separating liquid propane from the solution intermediate said zones.

12. The method of refrigeration which includes evaporating liquid ammonia and propane in the presence of each other, flowing water in contact with the resulting vapors at a temperature to cause only absorption of ammonia into solution, flowing the water in contact with the vapors prior to said first contact at a temperature to cause both further absorption of ammonia into solution and condensation of the propane, and withdrawing the condensed propane intermediate said contacts.

13. The method of refrigeration which comprises distilling a first refrigerant liquid from solution in a liquid absorbent, evaporating the distilled refrigerant liquid and a second refrigerant liquid in the presence of each other, conducting the resulting vapors first in counterflow to and contact with liquid absorbent from which said first refrigerant was previously distilled, to cause absorption of said first refrigerant in a zone above the condensing temperature of said second refrigerant, then conducting the vapors in similar relation to the absorbent in a zone below the condensing temperature of said second refrigerant to cause both further absorption of said first refrigerant and condensation of said second refrigerant to liquid phase, and separating said second refrigerant liquid from the liquid absorbent intermediate said zones.

14. The method of refrigeration which comprises evaporating a plurality of liquid refrigerants in the presence of each other, flowing a liquid absorbent in contact with the resulting vapors at a temperature to cause only absorption of one of said refrigerants into solution, flowing the liquid absorbent in contact with the vapors prior to said first contact at a temperature to cause both further absorption of said first refrigerant and condensation of another of said refrigerants, and withdrawing in liquid phase said second refrigerant intermediate said contacts.

15. In the process of refrigeration by circulating ammonia through a generation-condensation-evaporation-absorption cycle and circulating propane through an evaporation-condensation cycle in common respectively with the evaporation-absorption portion of the ammonia cycle, that improvement which comprises causing the absorption to take place in successive zones respectively above and below the respective condensing temperatures of the propane, and withdrawing liquid propane intermediate said zones.

16. In the process of refrigeration by circulating a first refrigerant fluid through a generation-condensation-evaporation-absorption cycle and circulating a second refrigerant fluid through an evaporation-condensation cycle in common respectively with the evaporation-absorption portion of said first cycle, that improvement which comprises causing the absorption to take place in successive zones respectively above and below the respective condensing temperatures of said second refrigerant fluid, and withdrawing said second refrigerant fluid in liquid phase intermediate said zones.

17. In refrigeration apparatus for causing circulation of a first refrigerant fluid through a generation-condensation-evaporation-absorption cycle and a second fluid through an evaporation-condensation cycle in common respectively with the evaporation-absorption portion of said first cycle, means for effecting the absorption in successive zones respectively above and below the respective condensing temperatures of said second fluid, and means for withdrawing condensate of said second fluid intermediate said zones.

18. In refrigeration apparatus for causing circulation of a first refrigerant fluid through a generation-condensation-evaporation-absorption cycle and a second fluid through an evaporation-condensation cycle in common respectively with the evaporation-absorption portion of said first cycle, means for effecting the absorption in successive zones respectively above and below the respective condensing temperatures of said second fluid, and means for decanting condensate of said second fluid intermediate said zones.

19. A refrigeration system including a vessel connected for flow of absorption liquid therethrough, an evaporator containing a plurality of cooling fluids, only one of which is soluble in said absorption liquid, and connected for flow of vapor to said vessel, means for maintaining successive portions of said vessel respectively in the direction of liquid flow, below and above the respective condensing temperatures of another of said cooling fluids, and means for withdrawing condensed cooling fluid intermediate said portions.

20. In an absorption refrigeration system of the type containing a liquid absorbent and a plurality of cooling fluids, one of which is immiscible with the absorbent, a circuit for the liquid absorbent including an absorber, the normal surface level of liquid in the absorber being in the lower part thereof, an evaporator connected to said absorber above said normal liquid level therein for flow of vapor and gravity flow of unevaporated liquid thereto from the evaporator, means above said liquid level in the absorber for separating immiscible liquid from the absorbent, and means for conducting the separated liquid to said evaporator.

21. In an absorption refrigeration system of the type containing a liquid absorbent and a plurality of cooling fluids, one of which is immiscible with the absorbent, a circuit for the liquid absorbent including an absorber, an evaporator, means for conducting unevaporated liquid from said evaporator to said absorber by gravity, and means for transferring immiscible cooling liquid from said absorber to said evaporator by gravity.

22. In an absorption refrigeration system comprising a generator, condenser, an evaporator, and an absorber connected for circulation of a first cooling fluid through said elements in series respectively and circulation of a second cooling fluid through and between only said evaporator and absorber, a gravity drain for unevaporated liquid from said evaporator to said absorber, means for causing condensation of said second cooling fluid in the absorber, and means for transferring the liquid condensate to said evaporator by gravity.

23. In an absorption refrigeration system including a generator, a condenser, an evaporator, and an absorber, said system being arranged for evaporation of a plurality of refrigerant fluids in said evaporator and liquefaction of said fluids in the absorber, a separator associated with said absorber and comprising means for maintaining balancing liquid columns in series, means for delivering liquid to one of said columns, means for withdrawing liquid from another of said columns to determine the surface level of liquid in the latter, means for withdrawing liquid from said first column at a level above the surface level of said other column, and means for separately conducting liquid from said withdrawing means to said generator and evaporator respectively.

24. In an absorption refrigeration system including a generator, a condenser, an evaporator, and an absorber, said system being arranged for evaporation of a plurality of refrigerant fluids in said evaporator and liquefaction of said fluids in the absorber, a separator associated with said absorber and comprising means for maintaining balancing liquid columns in series, means for delivering liquid to one of said columns, overflow means for determining the surface level of liquid in another of said columns, means for withdrawing liquid from said first column at a level above the surface level of said other column, and means for separately conducting liquid from said overflow means and said withdrawing means to said generator and evaporator respectively.

25. In an absorption refrigeration system including a generator, a condenser, an evaporator, and an absorber, said system being arranged for evaporation of a plurality of refrigerant fluids in said evaporator and liquefaction of said fluids in the absorber, a separator associated with said absorber and comprising means for maintaining balancing liquid columns in series, means for delivering liquid to one of said columns, overflow means for determining the surface level of liquid in another of said columns, a second overflow means for withdrawing liquid from said first column at a level above the surface level of said other column, and means for separately conducting liquid from said overflow means to said generator and evaporator respectively.

26. The method of refrigerating which comprises evaporating a plurality of cooling fluids in the presence of each other, absorbing one of the cooling fluids out of the resulting gas mixture into an absorption liquid, condensing a second of said cooling fluids to liquid in the presence of said absorption liquid, expelling the first cooling fluid from the absorption liquid by heating, condensing the expelled cooling fluid to liquid, and conducting in liquid phase the second cooling fluid out of the presence of said absorption liquid into the presence of the condensate of said first cooling fluid.

27. The method of refrigerating which comprises evaporating liquid ammonia and propane in the presence of each other, absorbing ammonia out of the resulting gas mixture into water, condensing the propane gas to liquid in the presence of the water, expelling ammonia gas from the water solution by heating, condensing the ammonia gas to liquid, and conducting in liquid phase the propane from the presence of the water solution of ammonia into the presence of the condensed ammonia.

28. An absorption refrigeration system including a generator, an evaporator, a vessel interconnected with said generator for circulation of liquid therebetween and having an inlet connection for vapor from said evaporator, means forming a path of flow for liquid through said vessel including means for detaining liquid in a body having surface levels independent of other liquid surface levels in the system, and means for conducting immiscible liquid from said body to said evaporator.

HARRY C. SHAGALOFF.